Figure 1:
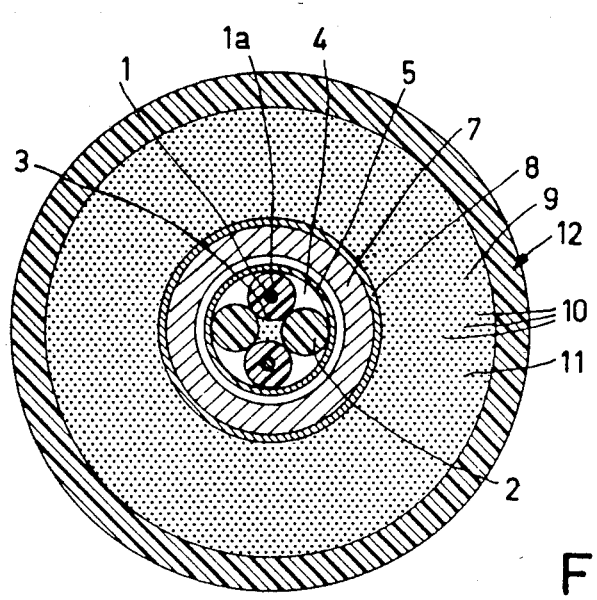

United States Patent [19]

Brüggendieck

[11] Patent Number: 4,534,618
[45] Date of Patent: Aug. 13, 1985

[54] OPTICAL COMMUNICATION CABLE

[75] Inventor: Siegfried Brüggendieck, Radevormwald, Fed. Rep. of Germany

[73] Assignee: U.S. Philips Corporation, New York, N.Y.

[21] Appl. No.: 435,024

[22] Filed: Oct. 18, 1982

[30] Foreign Application Priority Data

Apr. 21, 1982 [DE] Fed. Rep. of Germany ....... 3214778

[51] Int. Cl.$^3$ .............................................. G02B 5/14
[52] U.S. Cl. .................................................. 350/96.23
[58] Field of Search ..................................... 350/96.23

[56] References Cited

U.S. PATENT DOCUMENTS 4,342,500 8/1982 Oestreich et al. ................ 350/96.23
4,392,714 7/1983 Bruggendieck et al. ........ 350/96.23

Primary Examiner—William L. Sikes
Assistant Examiner—Robert E. Wise
Attorney, Agent, or Firm—Marc D. Schechter

[57] ABSTRACT

Optical communication cable consisting of a cable core having light waveguides (1) and a sheath of synthetic resin which surrounds same and has glass fiber elements taking up tensile forces. The glass fiber elements (10) are formed into at least one uniform strand (16) by means of a binder (11) of synthetic resin and in the cable sheath constitute at least a part by volume of 10%, the part by volume in the strand being at least 70%.

12 Claims, 4 Drawing Figures

OPTICAL COMMUNICATION CABLE

The present invention relates to an optical communication cable consisting of a cable core having optical fibers and a sheath of synthetic resin surrounding same and having glass fiber elements which take up tensile forces.

For the relief of tensile stress in sheaths of synthetic resin of optical communication cables, in particular overhead cables, it is known to provide glass fiber bundles. This construction has been used for years already. For cables having light wave guides the shrinkage effects occur which are known in sheaths of thermoplasts, such as polyethylene, which under unfavourable conditions may lead to an increase of the damping or even to fracture of the light wave guides in the cable core.

It is the object of the present invention, starting from an optical communication cable of the kind described in the opening paragraph, to improve same in such manner that shrinkage effects in the cable sheath cause no increase in damping or no fracture of the light wave guides in the cable core.

According to the invention this is achieved in that the glass fiber elements are formed into at least one uniform strand by a binder of synthetic resin and in the cable sheath constitute at least a part by volume of 10% and their part by volume in the strand is at least 70%. The invention is based on the recognition of the fact that the glass fiber strands in the cable sheath determine the shear and tensile behaviours of the overall cable so that the shear behaviour in particular also of the sheath is adapted to that of the light wave guide in the cable core. In contrast with the known cable constructions the invention is based on the fact that it is not only the presence of elements taking up tensile forces in the cable sheath that matter, but that the glass fiber elements present in the cable sheath must also be suitable to influence the shear behaviour of the cable in such manner that the shrinkage behaviour of the cable sheath corresponds to that of the optical fibers in the cable core. The part by volume of the glass fibers in the strands is advantageously 80%.

In an advantageous embodiment of the invention the glass fiber strand may be constructed as a tube which substantially forms the cable sheath and which hence takes the place of an outer sheath.

Alternatively it may also be advantageous when the glass fiber strands according to the invention are formed as round wires. These may extend parallel to the longitudinal axis of the cable or may also be twisted.

Figure 2:
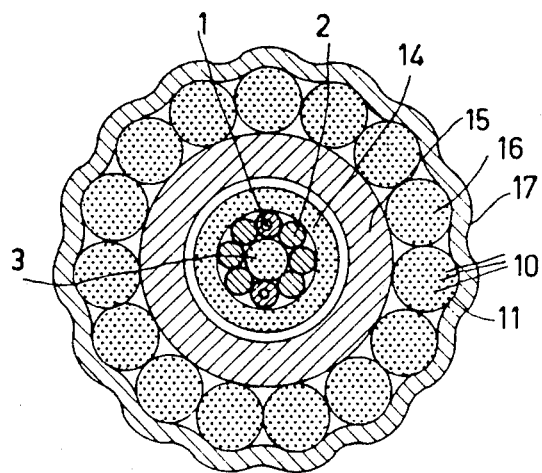
Figure 3:
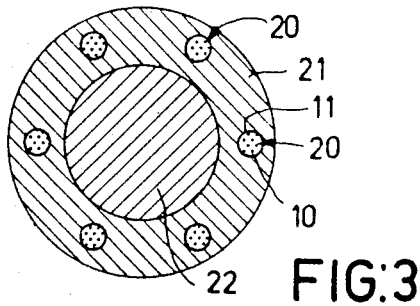
Figure 4:
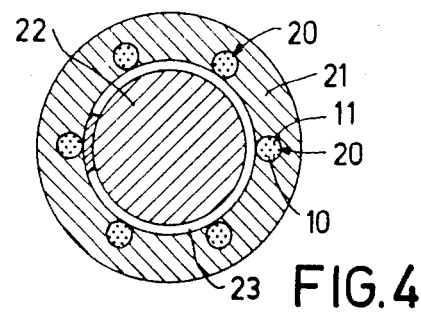

The invention will now be described in greater detail with reference to the embodiments shown in the accompanying drawings, in which:

FIG. 1 is a sectional view through an optical communication cable according to the invention, FIG. 2 is a sectional view through a further embodiment of a communication cable according to the invention, FIG. 3 is a sectional view through a principle representation of a cable according to the invention, FIG. 4 is a sectional view through a principle representation of a further embodiment of the cable according to the invention.

As shown in FIG. 1, an optical communication cable consists, for example, of two light guides 1 which are surrounded, for example, by a rigid coating 1a of synthetic resin. The light wave guides 1 are twisted around a core strand 3 with two strands 2 of synthetic resin. The cable rope 4 thus obtained is surrounded by a foil 5 of a readily conductive synthetic resin which is surrounded by a hose 7. As a result of this an optimum protection against all kinds of mechanical stresses occurring, for example, bending stresses and vibration stresses and transverse forces is achieved. The hose 7 preferably consists of polyvinylidene fluoride. The hose 7 seals the cable core.

A tube 9 consisting of unidirectionally bonded glass fibers 10 which are reinforced and moulded, respectively, by a binder 11 of in particular polyester resin substantially forms the outer sheath of the cable. The part by volume of the glass fibers 10 in the tube is at least 70%, preferably 80%. The glass fibers 10 preferably have a diameter of 23 μm and consist of E Glass. E Glass is waterproof borosilicate glass which is deficient in alkali and has less than 1% $K_2O + Na_2O$. By using glasses having a higher E module than E glass, an improvement of the modulus of elasticity of the tube can be achieved. The coefficient of thermal expansion of the tube 9 is approximately $10 \times 10^{-6}/°C$. The wall thickness of the tube 9 is approximately 2 mm. Between the tube 9 and the underlying cable core a separating foil 8 is provided. The tube 9 takes up the shearing stresses in particular by shrinkage and the tensile stress occurring in the sheath, in which a behaviour corresponding to the light wave guide fibers is achieved so that an increase in damping in the light wave guides on the basis of occurring shrinkage stresses can be avoided. The tube 9 is surrounded by a cladding 12 which preferably consists of polypropylene and is approxmately 0.6 mm thick. The object of the cladding is to form a protection against atmospheric influences.

FIG. 2 shows a further embodiment of a cable in accordance with the invention. It again consists, for example, of two light wave guides 1 which are twisted around a core strand 3 with strands 2 of synthetic resin in a length of twist of approximately 65 mm. A layer 14 of a foamed foil is present thereon in a thickness of approximately 0.9 mm. A hose 15 of high pressure polyethylene having a thickness of 1.6 mm forms the outer seal of the cable core. The outer sheath is formed by strands 16 which, as the tube 9 in FIG. 1, also consist of glass fibers 10 bonded by a binder 11. The strands 16 have a diameter, for example, of 2 mm and are twisted with a large length of twist, for example 400 mm. The glass fiber part per strand is again at least 70% by volume. The outer seal is again formed by a cladding 17 corresponding to that of FIG. 1. The cable shown in FIG. 2 has an overall diameter of approximately 14 mm. As the cable shown in FIG. 1 it is distinguished by being entirely free from metal.

Both types of cable shown in FIGS. 1 and 2 are constructed for very high tensile loads by which the large part by volume of the material of the glass fiber strands in the cable sheath is explained.

FIG. 3 shows a further embodiment of a cable in accordance with the invention in which the reinforcement strands 20 taking up tensile stress and shearing stress again consist of glass fiber 10 which are reinforced by a binder 11 in accordance with the strands of FIG. 2. The reinforcement strands 20 are embedded in a cladding 21 with which they seal the cable core 22. The glass fibers of the reinforcement strands 20 per strand again form a part by volume of at least 70%. The part by volume of the strands 20 in the cladding may be, for example, 10%. In this case the cable according to the invention is not so much constructed for tensile load but in such manner that the shear stresses are taken up by strands since the strands serve substantially as a corset of the sheath and determine their behaviour.

FIG. 4 shows a further possibility of the construction of a cable in accordance with the invention. In this case a core winding 23 is provided as an open coil around the cable core 22. The reinforcement strands 20 are again in the form of a wire and correspond in construction to those of FIG. 3, Said reinforcement strands 20 are provided over the core winding 23. Due to the open construction of the core winding 23 it is achieved that the reinforcement strands 20 are enclosed at least partly by the cladding 21. The part of the glass fibers in the reinforcement strands 20 bonded by a binder is again at least 70%.

The cables according to the invention described may be used as self-supporting overhead cables or also in certain applications as an underground cable. They are distinguished by a high span width with high part by volume of the glass fiber strands and in addition in that their sheath has a temperature-compensated behaviour against the light waveguides in the cable core so that temperature-dependent shrinkage stresses do not lead to an increase in damping in the light waveguides or even cause fracture thereof.

I claim:

1. An optical communication cable consisting of a cable core having optical fibers and sheath of synthetic resin surrounding said optical fibers and having glass fiber elements taking up tensile forces, the improvement therein comprising a binder of synthetic resin, said binder forming and holding said glass fiber elements in at least one uniform strand, said fibers being distributed in said resin, said fiber elements constituting at least 10% by volume of said cable sheath and at least 70% by volume of said at least one uniform strand.

2. A communication cable as claimed in claim 1, characterized in that the glass fibre elements comprise a part by volume of 80% in the strand.

3. A communication cable as claimed in claim 2, characterized in that the glass fiber elements consist of unidirectionally bonded glass fibers.

4. A communication cable as claimed in claim 3, characterized in that the glass fibers consist of E Glass.

5. A communication cable as claimed in claim 4, characterized in that the strand consists of a tube substantially forming the cable sheath.

6. A communication cable as claimed in claim 4, characterized in that several strands formed in particular as round wires are provided around the cable core at equal distances from each other.

7. A communication cable as claimed in claim 6, characterized in that the strands are one of extended parallel to the longitudinal axis of the cable and twisted.

8. A communication cable as claimed in claim 7, characterized in that the strands are surrounded by an outer cladding of synthetic resin.

9. A communication cable as claimed in claim 7, characterized in that the strands are embedded at least partly in a cladding.

10. A communication cable as claimed in claim 9, characterized in that the cable is temperature-compensated.

11. A communication cable as claimed in claim 10, characterized in that polyester is used as binder.

12. A communication cable as claimed in claim 1, characterized in that the glass fiber elements consist of unidirectionally bonded glass fibers.

* * * * *